United States Patent
Mauro et al.

(10) Patent No.: US 7,512,346 B2
(45) Date of Patent: Mar. 31, 2009

(54) OPTICAL FIBER WITH LOW SECOND ORDER DISTORTION

(75) Inventors: John Christopher Mauro, Painted Post, NY (US); Srikanth Raghavan, Ithaca, NY (US)

(73) Assignee: Corning Incorporated, Corning, NY (US)

(*) Notice: Subject to any disclaimer, the term of this patent is extended or adjusted under 35 U.S.C. 154(b) by 503 days.

(21) Appl. No.: 11/357,277

(22) Filed: Feb. 16, 2006

(65) Prior Publication Data
US 2007/0189769 A1 Aug. 16, 2007

(51) Int. Cl.
*H04B 10/12* (2006.01)

(52) U.S. Cl. ............... 398/148; 398/147; 398/193; 398/159; 398/81

(58) Field of Classification Search .......... 398/66, 398/81, 148, 147, 193, 159
See application file for complete search history.

(56) References Cited

U.S. PATENT DOCUMENTS

| | | | |
|---|---|---|---|
| 5,828,477 A | 10/1998 | Nilsson et al. | 359/181 |
| 5,930,024 A | 7/1999 | Atlas | 359/279 |
| 6,330,381 B1* | 12/2001 | Lu et al. | 385/24 |
| 7,102,812 B2* | 9/2006 | Diep et al. | 359/337.5 |
| 7,292,790 B1* | 11/2007 | Sardesai | 398/148 |
| 2004/0151510 A1* | 8/2004 | Tanaka et al. | 398/147 |
| 2005/0123304 A1* | 6/2005 | Lehmann et al. | 398/147 |
| 2005/0244164 A1* | 11/2005 | Miyashita et al. | 398/147 |
| 2006/0045534 A1* | 3/2006 | Miyamoto et al. | 398/148 |
| 2007/0031155 A1* | 2/2007 | Minzioni et al. | 398/147 |

OTHER PUBLICATIONS

F.W. Willems, et al, "Simultaneous Suppression of Stimulation Brillouin Scattering and Interferometric Noise in Externally Modulated Lightware AM-SCM Systems", IEEE Photon. Technol. Lett., vol. 6, pp. 1476-1478, Dec. 1994.

M. Ramachandran and C.S. Jasti, "Dispersion Compensation Techniques for CATV Lightwave Transmission Systems," OFC'97, Paper ThP5, 1997.

J.H. Su et al, "Composite-Second Order Improvement of 15 dB in an Optically Amplified 110-km AM-VSB CATV Transport System Using Chirped Fiber Grating," OFC '99, Paper TuP2-1, 1999.

* cited by examiner

*Primary Examiner*—Ken N Vanderpuye
*Assistant Examiner*—Hibret A Woldekidan
(74) *Attorney, Agent, or Firm*—Svetlana Z. Short

(57) ABSTRACT

An optical fiber system comprising: (i) a dispersion pre-compensator including dispersion compensating fiber DCF characterized by the overall dispersion value $D_{DCF}$ at the operating wavelength $\lambda$; and (ii) a passive optical network (PON) including a plurality of transmission paths provided by a plurality of optical fibers, said plurality of transmission paths having a minimum and maximum dispersion value $D_{MIN}$ and $D_{MAX}$; wherein the dispersion pre-compensator includes an output port operatively coupled to an input port of the a passive optical network and $-D_{MAX} < D_{DCF} < -D_{MIN}$.

15 Claims, 4 Drawing Sheets

OPTICAL FIBER WITH LOW SECOND ORDER DISTORTION

BACKGROUND OF THE INVENTION

1. Field of the Invention

The present invention relates generally to optical fiber systems and particularly to suppression of second order distortions using dispersion compensation.

2. Technical Background

Optical fiber transmission systems were developed some thirty years ago for long-distance telecommunication because of their immunity from electromagnetic interference, large bandwidth, light weight, and other advantageous properties. The typical optical fiber has a high-refractive-index core region surrounded by a low-refractive-index cladding. A protective coating is usually provided over the cladding to protect the structure from the environment.

The distance over which optical signals can be transmitted over an optical fiber is limited by attenuation due to absorption and scattering (e.g., Rayleigh, Brillouin and weak scattering), as well as from geometric effects (e.g., bending). Consequently, over the years tremendous effort has been directed to studying and reducing these sources of signal attenuation (loss).

Stimulated Brillouin Scattering (SBS) is a dominant nonlinear penalty in many optical transmission systems. In many transmission systems, for example in networks carrying cable TV (CATV) transmission signals, it is desirable to transmit large optical power through optical fibers, while maintaining high signal to noise ratio (SNR). However, as the power of the incident optical signal launched into an optical fiber increases, it may exceed a certain threshold power (SBS threshold) and part of the signal power will then be reflected back due to SBS. Thus, due to SBS, a large amount of the signal power can be lost due to reflection back toward the transmitter. In addition, the scattering process increases the noise level at the signal wavelength. The combination of decrease in signal power and increase in the noise lowers SNR and leads to performance degradation.

An intense optical field (associated with the high power optical signal propagating through transmission fiber) generates pressure or sound waves through electrostriction due to the beating of intense incident and spontaneous reflected light, giving rise to pressure or acoustic waves. The change in pressure causes material density to change, thereby resulting in refractive index fluctuations. The net result is that an intense electrical field component of the optical wave generates pressure or sound (acoustic) waves which cause material density fluctuations. The acoustic wave changes the refractive index and enhances the reflected light amplitude through Bragg diffraction, thus resulting in SBS. Above the SBS threshold of an optical fiber, the number of stimulated photons is very high, resulting in a strong reflected field which limits the optical power that is transmitted, and which reduces the signal to noise ratio SNR.

Some approaches to solving this problem utilize phase modulation, which increases the SBS threshold power. However, the interaction of the phase modulation with the fiber dispersion leads to an increased composite second order CSO distortion. CSO distortion is undesirable because it degrades signal quality.

SUMMARY OF THE INVENTION

According to some embodiments of the invention, the optical fiber system comprises:

a dispersion pre-compensator including dispersion compensating fiber DCF characterized by the overall dispersion value $D_{DCF}$ (ps/nm) at the operating wavelength $\lambda$; and a passive optical network (PON) including a plurality of transmission paths provided by a plurality of optical fibers having a total average dispersion value $D_{TOTav}$; wherein the dispersion pre-compensator includes an output port operatively coupled to an input port of the passive optical network (PON) and the dispersion pre-compensator substantially compensates for dispersion introduced by the PON, such that $DCF \approx D_{TOTav}$. According to some of the embodiments $DCF = -D_{TOTav} \pm 0.15\, D_{TOTav}$, preferably $DCF = -D_{TOTav} \pm 0.1\, D_{TOTav}$. Preferably, the dispersion compensating fiber DCF is characterized by the dispersion value $d_{DCF}$ (ps/nm/km) at the operating wavelength and fiber length $L_{DCF}$; and the each of the transmission paths, i, corresponding to the plurality of optical fibers of the passive optical network (PON) are characterized by dispersion value $d_i$ and length $L_i$; such that $d_{DCF} \times L_{DCF} \approx \Sigma_i (d_i \times L_i)/N$, where N is the number of the transmission paths and where the summation is over $i=1, 2, \ldots, N$. Preferably the length $L_i$ is between 0.1 and 60 km. Also preferably, the average length of the transmission path $(\Sigma_i L_i)/N$ is between 0.1 km and 50 km, more preferably between 5 km and 20 km.

According to some embodiments of the invention, the optical fiber system comprises:

a dispersion pre-compensator including dispersion compensating fiber DCF characterized by the overall dispersion value $D_{DCF}$ at the operating wavelength $\lambda$; and a passive optical network (PON) including a plurality of transmission paths provided by a plurality of optical fibers, said plurality of transmission paths having a minimum and maximum dispersion value $D_{MIN}$ and $D_{MAX}$;

wherein the dispersion pre-compensator includes an output port operatively coupled to an input port of the passive optical network (PON) and $$-D_{MAX} <- |D_{DCF}| <- D_{MIN}.$$

Preferably, the embodiments of the optical fiber described and disclosed herein allow suitable performance at a plurality of operating wavelength windows between about 800 nm and about 1650 nm. The optical transmission system may operate at one wavelength window or may simultaneously operate at multiple windows within this range. For example, some of the embodiments of the optical fiber described and disclosed herein allow suitable performance at a plurality of wavelengths from about 1260 nm to about 1650 nm. In some of the embodiments of the optical fiber of this type, the optical fibers described and disclosed herein can accommodate operation in at least the 1310 nm centered window, the 1480 nm centered window, and/or the 1550 nm centered window. The optical fiber system according to the embodiments of the present invention advantageously has a high threshold for stimulated Brillouin scattering and low CSO distortion.

Disclosed herein is an optical fiber system which advantageously has a high threshold for stimulated Brillouin scattering and low CSO distortion.

Reference will now be made in detail to the present preferred embodiments of the invention, examples of which are illustrated in the accompanying drawings.

DETAILED DESCRIPTION OF THE EMBODIMENTS

Figure 1A:
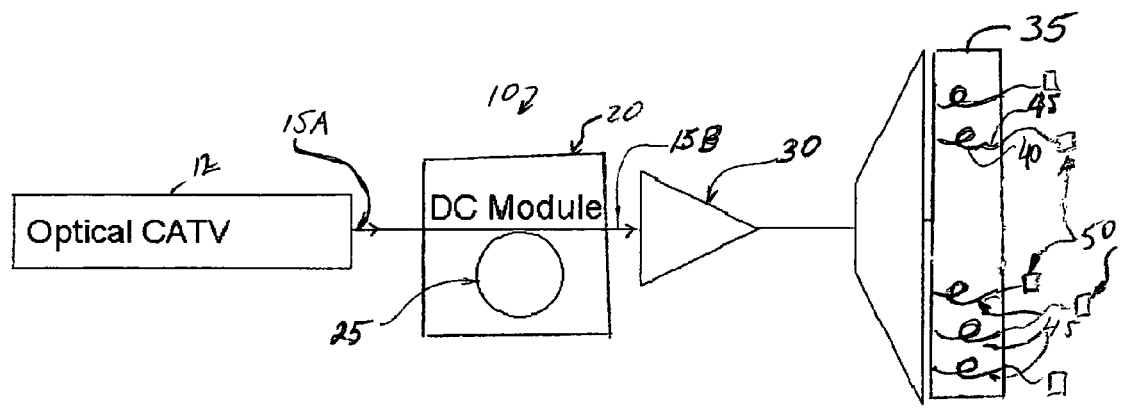
FIGS. 1A, 1B illustrate schematically an embodiment of the optical fiber system 10 according to the present invention.

Additional features and advantages of the invention will be set forth in the detailed description which follows and will be apparent to those skilled in the art from the description or recognized by practicing the invention as described in the following description together with the claims and appended drawings.

Unless otherwise noted herein, optical properties (such as dispersion, dispersion slope, etc.) are reported for the LP01 mode.

A waveguide fiber telecommunications link, or simply a link, is made up of a transmitter of light signals, a receiver of light signals, and a length of waveguide fiber or fibers having respective ends optically coupled to the transmitter and receiver to propagate light signals there between. The length of waveguide fiber can be made up of a plurality of shorter lengths that are spliced or connected together in end to end series arrangement. A link can include additional optical components such as optical attenuators, optical isolators, optical switches, optical filters, optical splitters, or multiplexing or demultiplexing devices. One may denote a group of inter-connected links as a telecommunications system.

Various wavelength bands, or operating wavelength ranges, or wavelength windows, can be defined as follows: "1310 nm band" is 1260 to 1360 nm; "E-band" is 1360 to 1460 nm; "S-band" is 1460 to 1530 nm; "C-band" is 1530 to 1565 nm; "L-band" is 1565 to 1625 nm; and "U-band" is 1625 to 1675 nm.

When an optical wave propagates in an optical waveguide in which acoustic modes are present, the optical wave is scattered by the acoustic wave. The electric field that describes the SBS satisfies the nonlinear wave equation:

$$\nabla^2 \tilde{E} = \mu_0 \varepsilon_0 \varepsilon \frac{\partial^2 \tilde{E}}{\partial t^2} + \mu_0 \frac{\partial^2 \tilde{P}_{NL}}{\partial t^2} \quad (1)$$

$$\tilde{P}_{NL} = \frac{\gamma}{\rho_0} \tilde{\rho} \tilde{E} \quad (2)$$

where $\varepsilon = \varepsilon_r - i\varepsilon_i$ is complex dielectric constant, $P_{NL}$ is the nonlinear polarization due to the interaction between the electrical field and acoustic field, $\rho_0$ is the material density, $\wp$ is the density fluctuation caused by the acoustic wave, which satisfies the nonlinear acoustic wave equation:

$$\frac{\partial^2 \tilde{\rho}}{\partial t^2} = \left(V_L^2 + \Gamma \frac{\partial}{\partial t}\right)\nabla^2 \tilde{\rho} - \frac{\gamma}{2}\nabla^2 \tilde{E}^2 \quad (3)$$

where $\gamma$ is electrostrictive coefficient, $\Gamma$ is the damping factor, and $V_L$ is the longitudinal acoustic velocity. The electric field can be written in the following form:

$$\tilde{E} = A_p(z)E_p(r,\theta)e^{i(\omega_p t - \beta_p z)} + A_p(z)E_s(r,\theta)e^{i(\omega_s t + \beta_s z)} + c.c. \quad (4)$$

where $E_j$ (j=p,s) is the transverse electric filed distribution that satisfies the mode equation $$\nabla_t^2 E_j + (\mu_0 \varepsilon_0 \varepsilon_r \omega_j^2 - \beta_j^2)E_j = 0 \quad (5)$$

$\omega_j$ (j=p,s) is the optical frequency, $\beta_j$ (j=p,s) is the optical propagation constant, p denotes the pump signal, and s denotes the Brillouin scattering signal. Without the electric field, the acoustic wave equation has a set of modal solutions $\rho_\mu$. With the electric field in Eq. (4), we assume a solution of the following form $$\tilde{\rho} = \sum_u A_u(z)\rho_u(r,\theta)e^{i(\Omega_u t - B_u z)} + c.c. \quad (6)$$

where $\Omega$ is the acoustic frequency and the B is the propagation constant of the acoustic mode. Neglecting the damping factor, the mode $\rho_\mu$ satisfies $$\nabla_t^2 \rho_u + \left(\frac{\Omega_u^2}{V_L^2} - B_u^2\right)\rho_u = 0 \quad (7)$$

From the above equations we can derive the equations for the optical power changes for the pump and the signal:

$$\frac{dP_p}{dz} = -\alpha_0 P_p - \sum \frac{1}{2}[g_u(e^{i\Delta\beta_u z - \alpha_u z} - 1) + g_u^*(e^{-i\Delta\beta_u z - \alpha_u z} - 1)]P_p P_s \quad (8)$$

$$\frac{dP_s}{dz} = \alpha_0 P_s - \sum \frac{1}{2}[g_u(e^{i\Delta\beta_u z - \alpha_u z} - 1) + g_u^*(e^{-i\Delta\beta_u z - \alpha_u z} - 1)]P_p P_s \quad (9)$$

where $g_u$ is the SBS gain coefficient due to acoustic mode number u $$g_u = \frac{g_0 \bar{I}_u^{ao}}{(\alpha_u - i\Delta\beta_u)KA_{\mathit{eff}}} \quad (10)$$

where $g_0$ is a parameter determined by the material, $\alpha_u$ is the loss of the acoustic mode, $\Delta\beta_u$ is the phase mismatch between the acoustic and optical modes, $A_{\mathit{eff}}$ is optical effective area, $$A_{\mathit{eff}} = \frac{\left(\int E_0 E_0^* r dr d\theta\right)^2}{\int (E_0 E_0^*)^2 r dr d\theta} \quad (11)$$

and $\bar{I}_u^{ao}$ is the normalized overlap integral between the electric and acoustic fields $$T_u^{ao} = \frac{\left(\int E_0 E_0^* \rho_u^* r dr d\theta\right)^2}{\int (E_0 E_0^*)^2 r dr d\theta \int \rho \rho^* r dr d\theta} \quad (12)$$

Equation (10) shows that the SBS gain coefficient depends on two parameters that related to fiber design: one is the optical effective area $A_{eff}$, the other is the overlap integral $T_u^{ao}$.

The SBS power grows exponentially with fiber length. For uniform Brillouin frequency shift along the fiber, the peak SBS power threshold is inversely proportional to the gain coefficient and fiber effective length:

$$P \propto \frac{1}{g_u L_{eff}} = \frac{K \alpha_u A_{eff}}{g_0 T_u^{ao} L_{eff}} = \frac{K \alpha_u F}{g_0 L_{eff}} \quad (14)$$

where $L_{eff}$ is the effective length of fiber defined by $$L_{eff} = \frac{1 - e^{-\alpha_o L}}{\alpha_o},$$

where $\alpha_o$ is the optical attenuation coefficient and L is the fiber length. However, SBS may be reduced by broadening the optical spectrum using laser dithering and/or optical phase modulation.

FIG. 1A illustrates schematically an embodiment of the optical fiber system 10 according to the present invention. An optical CATV (dithered) signal 15A is provided by an optical device 12 (that producing a CATV signal with phase modulation or dithering) to the dispersion pre-compensator, for example the DC module 20 which includes a length of dispersion compensating fiber DCF 25. The dispersion compensating module 20 introduces a predetermine amount of dispersion $D_{DCF}$ into the signal, thus providing a pre-chirped signal 15B. In this embodiment the pre-chirped optical signal 15B is amplified by at least one optical amplifier 30 and the amplified signal is provided to the passive optical network PON 35. The optical network PON 35 comprises a plurality of transmission paths 40 (e.g., fiber-to-the-home paths) provided by a plurality of optical fibers 45. Each of these fibers also introduces dispersion $D_i$ into the signal, but the dispersion introduced by the fibers 45 is of the opposite sign than the dispersion introduced by the dispersion compensating fiber DCF 25. Thus, the fibers 45 and the compensating fiber DCF 25 at least partially cancel each other's dispersion, minimizing or eliminating CSO distortion. The optical signal at the end of the link is converted to an electrical signal via an optical-to-electrical converter 50. This combination of the transmission fibers 45 and the compensating fiber DCF 25 advantageously allows for higher SBS threshold and enables one to use any phase modulation approach, or dithering tones to increase SBS while suppressing CSO distortion of the electrical signal spectrum at the end of the link.

Thus, according to an embodiment of the present invention, the optical fiber system comprises: a dispersion pre-compensator including dispersion compensating fiber DCF 25 characterized by the overall dispersion value $D_{DCF}$ (ps/nm) at the operating wavelength $\lambda$; and a passive optical network (PON) including a plurality of transmission paths provided by a plurality of optical fibers having a total average dispersion value $D_{TOTav}$. The dispersion pre-compensator includes an output port operatively coupled to an input port of the passive optical network (PON) and the dispersion pre-compensator substantially compensates for dispersion introduced by the PON, such that $D_{DCF} \approx -D_{TOTav}$. For example, if the average dispersion value introduced by an average transmission path is 350 ps/nm, the dispersion of DCF 25 should preferably be −350 ps/nm. It is preferable that $D_{DCF} = -D_{TOTav} \pm 0.2 D_{TOTav}$. According to some of the embodiments $D_{DCF} = -D_{TOTav} \pm 0.15 D_{TOTav}$, preferably $D_{DCF} = -D_{TOTav} \pm 0.1 D_{TOTav}$. Preferably, the dispersion compensating fiber DCF is characterized by the dispersion value $d_{DCF}$ (ps/nm/km) at the operating wavelength and length $L_{DCF}$; and each of the transmission paths corresponding to the plurality of optical fibers of the passive optical network (PON) are characterized by dispersion value $d_i$ and length $L_i$; and $d_{DCF} \times L_{DCF} \approx (\Sigma D_i)/N = \Sigma(d_i \times L_i)/N$ where N is the number of the transmission paths. Preferably the length $L_i$ is between 0.1 and 100 km. A typical length $L_i$ is 0.1 to 60 km. More preferably, the average length of the transmission path is between 0.2 km and 50 km, and even more preferably between 5 km and 20 km. Thus, it is preferable that the dispersion compensating fiber provides a pre-chirp (i.e., the amount of dispersion) that fully compensates for the average dispersion of the transmission paths (e.g., customer links) associated with the PON.

For example, the transmission fibers 45 may have $d_i$ of about 4 ps/nm/km or 17 ps/nm/km at the wavelength of 1550 nm. Thus if, for example, the PON average transmission path length is 10 km, then $D_{TOTav}$ is ether 40 ps/nm or 170 ps/nm at the operating wavelength of $\lambda$=1550 nm. Therefore, it is preferable that the DCF 25 have the overall dispersion value $D_{DCF}$ of about −40 ps/nm or −170 ps/nm, respectively. Since for any DCF 25, its $D_{DCF}$ equals to $D_{DCF}$ value times the length of DCF 25, then for any given $d_{DCF}$ value one can chose the length of the DCF 25 to provide the desired value $D_{DCF}$.

According to some embodiments of the invention, the plurality of transmission paths have a minimum and maximum dispersion value $D_{MIN}$ and $D_{MAX}$; and $-D_{MAX} \leq -|D_{DCF}| \leq -D_{MIN}$. Preferably, DCF is chosen such that CSO distortions are below the FCC threshold of −54 dBc at the receiver, for all of the transmission paths provided by a plurality of optical fibers within the PON. For example, the transmission fibers 45 constituting each transmission path within the PON have $d_i$ of about 4 ps/nm/km at the operating wavelength of 1550 nm, and if the minimum and maximum transmission path lengths within PON is 2 km and 30 km, respectively, then $D_{MIN}$=8 ps/nm (i.e, 2 km×4 ps/nm/km), and $D_{MAX}$=120 ps/km (i.e., 30 km×4 ps/nm/km). Accordingly the DCF should be chosen such that its $D_{DCF}$ is between −8 ps/nm and −120 ps/nm, (for example −10 ps/nm, −20 ps/nm, −50 ps/nm, −70 ps/nm, −90 ps/nm, or −110 ps/nm). Since for any DCF 25, its $D_{DCF}$ equals to the $d_{DCF}$ value times the length of DCF 25, then for any given $d_{DCF}$ value one can chose the length of the DCF 25 to provide the desired value $D_{DCF}$.

Figure 1B:
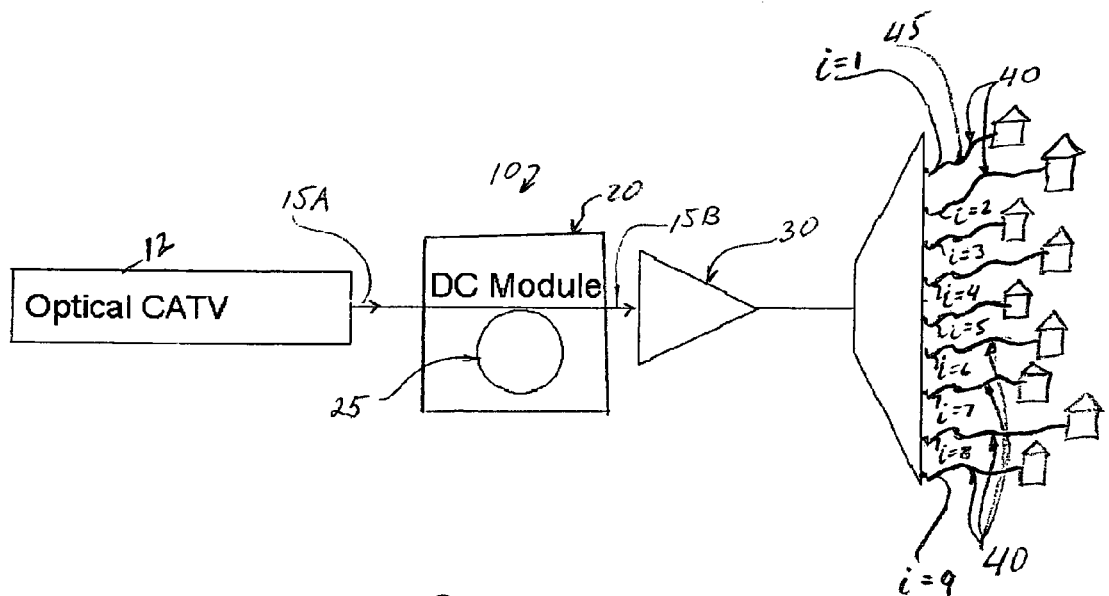

FIG. 1B illustrates schematically another embodiment of the optical fiber system 10 according to the present invention. An optical CATV (dithered) signal 15A is provided by the optical device 12 (that producing a CATV signal with phase modulation or dithering) to the DC module 20 which includes a length L of dispersion compensating fiber DCF 25. The dispersion compensating module 20 introduces a predetermine amount of dispersion into the signal, thus providing a pre-chirped signal 15B. In this embodiment the pre-chirped optical signal 15B is amplified by an optical amplifier 30 and the amplified signal is provided to the passive optical network PON 35. In this embodiment, the optical network PON 35 comprises nine fiber-to-the-home paths (transmission paths 40) provided by a plurality of optical fibers 45. Each of these fibers also introduces dispersion into the signal. In this exemplary embodiment the optical fibers 45 corresponding to the fiber-to-the-home paths 1-6 are transmission fibers, for example SMF-28® (d=17 ps/nm/km at 1550 nm), available from Corning, Inc., while optical fibers 45 corresponding to the fiber-to-the-home paths 7-9 are LEAF® fiber ($d_i$=4 ps/nm/km at 1550 nm), also available from Corning, Inc. The length $L_i$ of transmission path are as follows: $L_1$=3 km, $L_2$=5 km, $L_3$=10 km, $L_4$=6 km, $L_5$=4 km, $L_6$=2 km, $L_7$=12 km, $L_8$=18 km, $L_9$=21 km. Accordingly, the dispersion values corresponding to the nine transmission paths are: $D_1$=51 ps/nm; $D_2$=85 ps/nm; $D_3$=170 ps/nm; $D_4$=102 ps/nm; $D_5$=68 ps/nm; $D_6$=34 ps/nm; $D_7$=48 ps/nm; $D_8$=72 ps/nm; $D_9$=84 ps/nm. Therefore $D_{MAX}$=170 ps/nm; $D_{MIN}$=34 ps/nm; $D_{TOTav}$=79.33 ps/nm. The dispersion compensating module 20 introduces a predetermined amount of dispersion $D_{DCF}$ into the signal, and $D_{DCF}$ is chosen to be between −170 ps/nm and −34 ps/nm, so that $-D_{MAX} \leq -|D_{DCF}| \leq -D_{MIN}$. Preferably $D_{DCF}=-(D_{TOTav})$. The DCF 25 of this embodiment has a dispersion of −100 ps/nm/km, therefore, to achieve $D_{DCF}$ between D we need between 0.34 km and 1.7 km of the DCF. A length of 0.7933 km of this DCF 25 will provide $D_{DCF}$ of −79.33, which is what is needed if we desire that $D_{DCF}=-(D_{TOTav})$.

Thus, the fibers 45 and the compensating fiber DCF 25 at least partially cancel each other's dispersion, minimizing or eliminating CSO distortion. This advantageously allows for higher SBS threshold and enables one to use any phase modulation approach, or dithering tones to increase SBS while suppressing CSO distortion.

Preferably, the embodiments of the optical fiber described and disclosed herein allow suitable performance at a plurality of operating wavelength windows between about 800 nm and about 1650 nm. The optical transmission system may operate at one wavelength window or may simultaneously operate at multiple windows within this range. For example, some of the embodiments of the optical fiber described and disclosed herein allow suitable performance at a plurality of wavelengths from about 1260 nm to about 1650 nm. In some of the embodiments of the optical fiber of this type, the optical fibers described and disclosed herein can accommodate operation in at least the 1310 nm centered window, the 1480 nm centered window, and/or the 1550 nm centered window. For example, one embodiment may be a system with one signal at 1550 nm, where the dispersion is 17 ps/nm/km, and another signal at 1310 nm, where the dispersion is 2.6 ps/nm/km. If the link (path length) has a length of 10 km, then the accumulated dispersion at 1550 nm is 170 ps/nm, and the accumulated dispersion at 1310 nm is 26 ps/nm. In this embodiment, we consider a DCF with −100 ps/nm/km at 1550 nm and −15.3 ps/nm/km at 1310 nm. Therefore, in this embodiment, the optimal choice of $L_{DCF}$ is 1.7 km.

Figure 2:
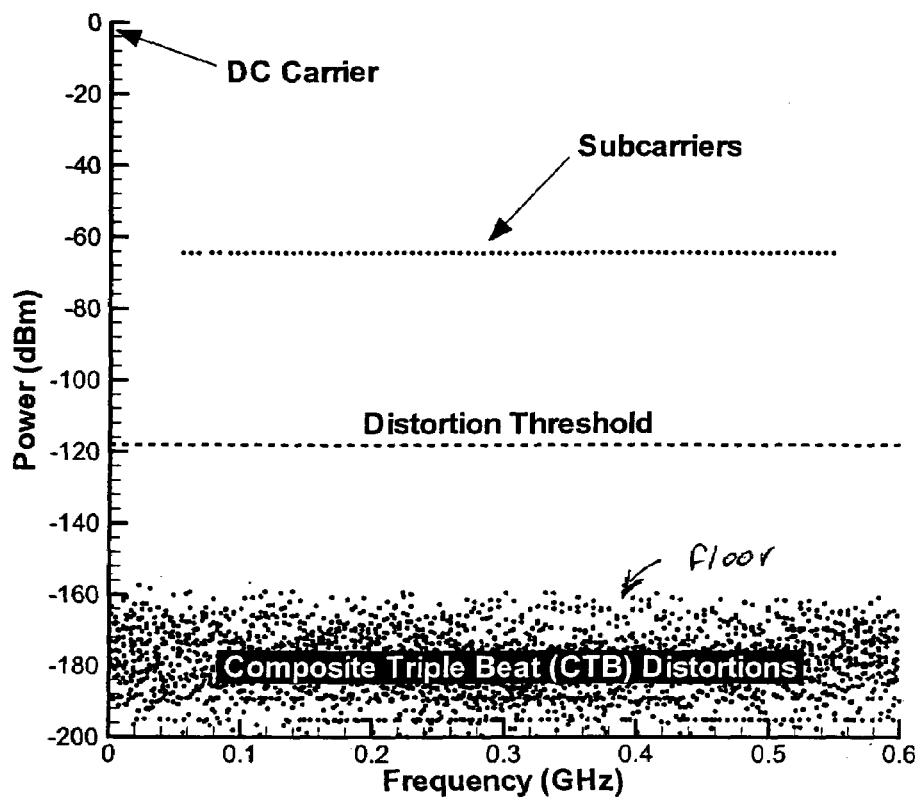
FIG. 2 illustrates the power (dBm) of the electrical spectrum of a subcarrier multiplexed (SCM) analog signal at the receiver.

Detection of a subcarrier multiplexed (SCM) optical signal results in the generation of a "floor" of distortions (see FIG. 2). According to FCC standards for analog transmission, these distortions must be no greater than −54 dBc (dB relative to the subcarriers). More specifically, FIG. 2 illustrates the power (dBm) of the electrical spectrum of a subcarrier multiplexed (SCM) analog signal at the receiver. Signal (cable TV channel information) is transmitted by the subcarrier frequencies. In this example, the information is modulated by the Mach-Zender modulator. However, other modulators may also be utilized. In this example, back-to-back distortions (i.e., distortions due to transmitter and receiver only) comprise entirely of composite triple beat (CTB) distortions due to the nonlinearity of the Mach-Zehnder transfer function.

Figure 3:
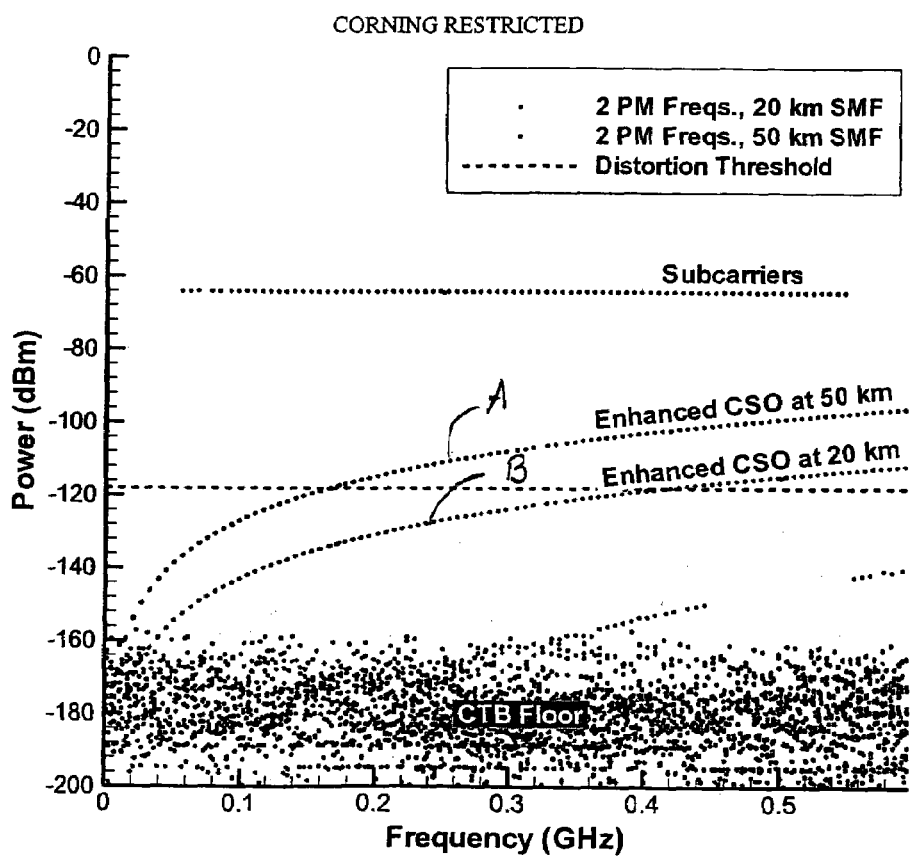
FIG. 3 illustrates that the interaction between the phase modulation and fiber dispersion creates enhanced CSO distortions.

Dithering and phase modulation are known to increase the SBS threshold of the system by broadening the signal spectrum. Unfortunately, interaction of this broadened spectrum with fiber dispersion creates enhanced CSO penalty after propagation through optical transmission fiber. This enhanced CSO can easily exceed the FCC threshold of −54 dBc, creating unacceptable penalties. FIG. 3 (curves A and B) illustrates CSO (produced by interaction of phase modulation with dispersion) produced in PON by the 50 km and 20 km lengths of optical transmission fiber, when the optical system does not include dispersion pre-compensator. FIG. 3 illustrates that with multiple phase modulation frequencies, the interaction between the phase modulation and fiber dispersion creates enhanced (i.e., greater) CSO distortions, significantly degrading system performance. The CSO distortions increase with dispersion and therefore also with fiber length. We mitigate this enhanced CSO by using dispersion compensating fiber at the head end of the network (for example, as shown in FIG. 1A).

Figure 4:
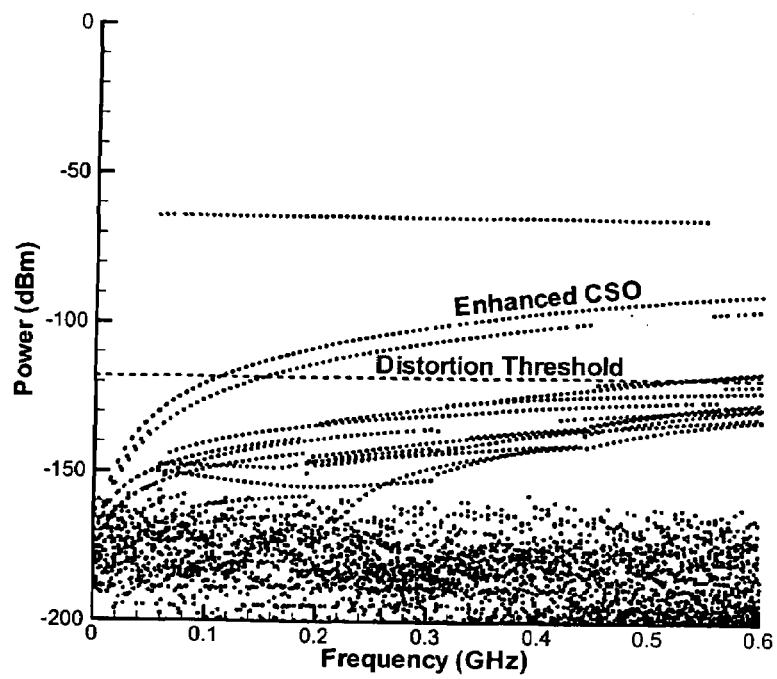
FIG. 4 illustrates the electrical subcarrier multiplexed spectrum immediately following the DC module.
Figure 5:
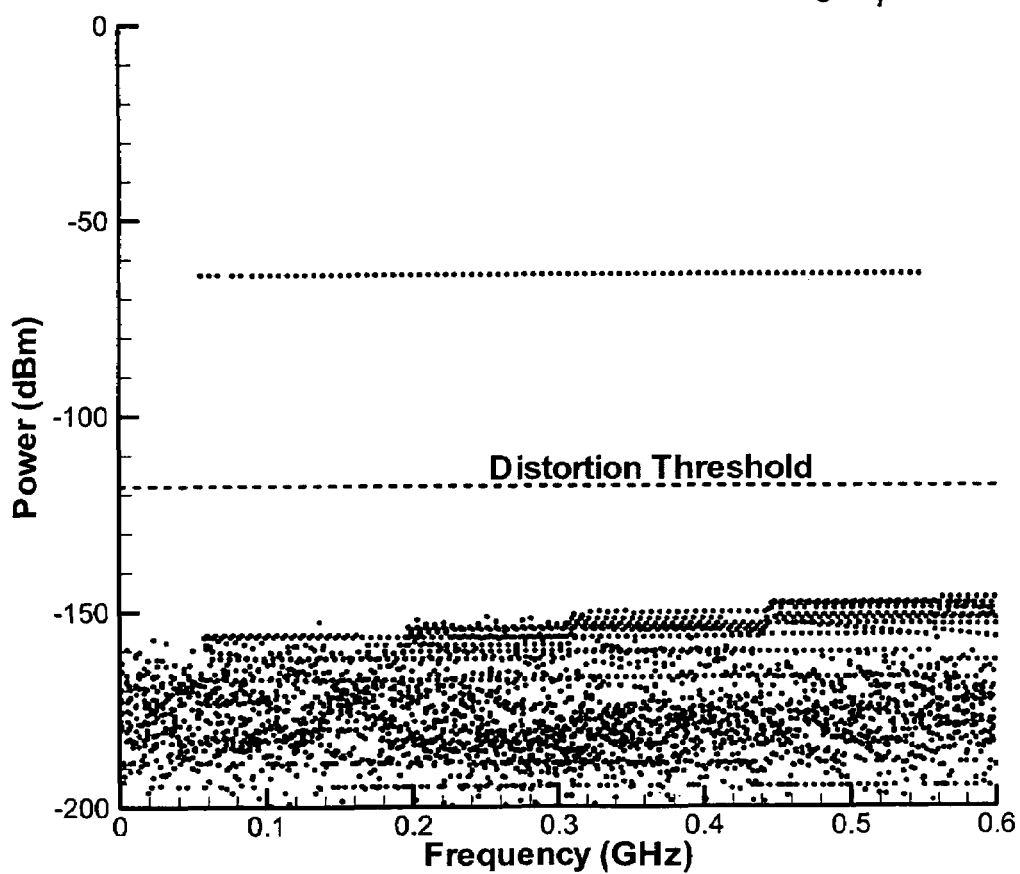
FIG. 5 illustrates the electrical subcarrier multiplexed spectrum immediately following an exemplary fiber link. This Figure shows that the enhanced CSO (due to fiber dispersion) is suppressed well below the −54 dBc distortion threshold.

The dispersion from the DC module 20 creates enhanced CSO distortion that will be cancelled out after propagation through the transmission fiber 45. In this embodiment, the length of DC fiber 25 is chosen to fully compensate for the dispersion of the average customer link length. The pre-chirp induced by the DC fiber effectively counteracts the dispersion of the transmission fiber, suppressing the CSO. If the link length is equal to the average link length, then the CSO is completely suppressed; for other link lengths, the CSO will be partially suppressed. The goal is to keep the CSO distortions below the FCC threshold of −54 dBc for the entire distribution of fiber lengths. FIG. 4 shows the electrical subcarrier multiplexed spectrum immediately following the DC module. Since the enhanced CSO power depends only on the magnitude of the accumulated dispersion and not its sign, we see that the pre-chirp from the DC module creates significant CSO distortion penalty, but this CSO distortion will be canceled out by the CSO distortion introduced by the transmission fiber. That is, the positive dispersion from the transmission fiber compensates for this negative pre-chirp, and FIG. 5 shows that the enhanced CSO has been completely suppressed at the customer end. More specifically, FIG. 5 shows that after propagation through the transmission fiber, the enhanced CSO is suppressed well below the −54 dBc distortion threshold.

Figure 6:
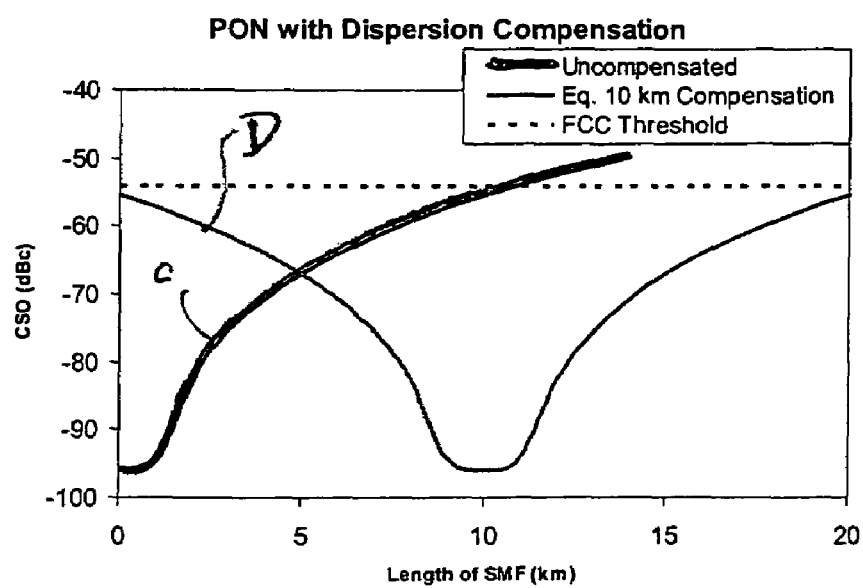
FIG. 6 illustrates CSO distortions as a function of fiber length when the optical system does not have the dispersion pre-compensator (curve C) and with the dispersion pre-compensator present (curve D).

As described above, CSO distortion originates from the interaction between the phase modulation (introduced to control SBS threshold power) and the fiber dispersion. Thus, if the overall dispersion of the optical system is minimized, CSO distortion is also minimized. FIG. 6 shows a plot (curve C) of uncompensated CSO distortion vs (SMF-28®) fiber length corresponding to different transmission paths 40 in an exemplary PON 35. In this optical system every transmission path 40 that includes a transmission fiber of length $L_i$ that is grater than 10 km exhibits CSO (dBc) that is larger than the FCC threshold level. The curve D corresponds to the optical system 10 that utilizes a dispersion pre-compensator (e.g., dispersion module 20) that is operatively connected to the input of the PON 35. FIG. 6 illustrates that when the dispersion pre-compensator is present the CSO dispersion present at the output end of the transmission path 40 is below the FCC threshold level for all transmission fibers 45 having a length between 0 and 20 km.

Disclosed herein is an optical fiber system which advantageously has a high threshold for stimulated Brillouin scattering and low CSO distortion.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description, serve to explain the principals and operation of the invention. It will become apparent to those skilled in the art that various modifications to the preferred embodiment of the invention as described herein can be made without departing from the spirit or scope of the invention as defined by the appended claims.

What is claimed is:

1. An optical fiber system comprising:
   a dispersion pre-compensator including dispersion compensating fiber DCF characterized by the overall dispersion value $D_{DCF}$ at the operating wavelength $\lambda$; and
   a passive optical network (PON) including a plurality of transmission paths provided by a plurality of optical fibers having a total average dispersion value $D_{TOTav}$;
   wherein the dispersion pre-compensator includes an output port operatively coupled to an input port of the a passive optical network (PON) and the dispersion pre-compensator substantially compensates for dispersion introduced by the PON, such that $D_{DCF} \approx -D_{TOTav}$, wherein
   the dispersion compensating fiber DCF is characterized by the overall dispersion value $d_{DCF}$ (ps/nm/km) at the operating wavelength and length $L_{DCF}$; and
   each of the transmission paths corresponding to the plurality of optical fibers of the passive optical network (PON) are characterized by dispersion value $d_i$ and length $L_i$; and $d_{DCF} \times L_{DCF} \approx -\Sigma(d_i \times L_i)/N$ where $N$ is the number of the transmission paths.

2. The optical fiber system according to claim 1, wherein $L_i$ is between 0.1 km and 60 km.

3. The optical fiber system according to claim 1, wherein the average length of the transmission path is between 0.1 km and 50 km.

4. The optical fiber system according to claim 1, wherein the average length of the transmission path is between 5 km and 20 km.

5. The optical fiber system according to claim 1, wherein $d_i \approx 4$ ps/nm/km at $\lambda=1550$ nm.

6. The optical fiber system according to claim 1, wherein $d_i \approx 17$ ps/nm/km at $\lambda=1550$ nm.

7. The optical fiber system according to claim 1, wherein the operating wavelength $\lambda$ is within 800 nm and about 1650 nm.

8. The optical fiber system according to claim 1, wherein the operating wavelength $\lambda$ is within an operating window centered around 1310 nm, 1480 nm, and/or the 1550 nm.

9. The optical fiber system according to claim 1, wherein DCF is chosen to provide $D_{DCF}$, such that CSO distortions are below the FCC threshold of $-54$ dBc for all of the transmission paths provided by a plurality of optical fibers within the PON.

10. An optical fiber system according to claim 1, said fiber system further comprising:
    an optical device producing a CATV signal with phase modulation or dithering.

11. The optical fiber system according to claim 9, wherein $D_{DCF} = -D_{TOTav} \pm 0.2 D_{TOTav}$.

12. The optical fiber system according to claim 9, wherein the dispersion compensating fiber DCF is characterized by the overall dispersion value $d_{DCF}$ (ps/nm/km) at the operating wavelength $\lambda$ and length $L_{DCF}$; and
    the each of the transmission paths corresponding to the plurality of optical fibers of the passive optical network (PON) are characterized by dispersion value $d_{DCFi}$ and length $L_i$; and $d_{DCF} \times L_{DCF} \approx \Sigma(d_{DCFi} \times L_i)/N$ where $N$ is the number of the transmission paths.

13. The optical fiber system according to claim 11, wherein $L_i$ is between 0.1 km and 60 km.

14. The optical fiber system according to claim 11, wherein the average length of the transmission path is between 0.1 km and 50 km.

15. The optical fiber system according to claim 9, wherein the operating wavelength $\lambda$ is within an operating window centered around 1310 nm, 1480 nm, and/or the 1550 nm.

* * * * *